April 20, 1937.   H. RUPPE ET AL   2,077,643
ELECTRIC POCKET FAN
Filed July 16, 1935
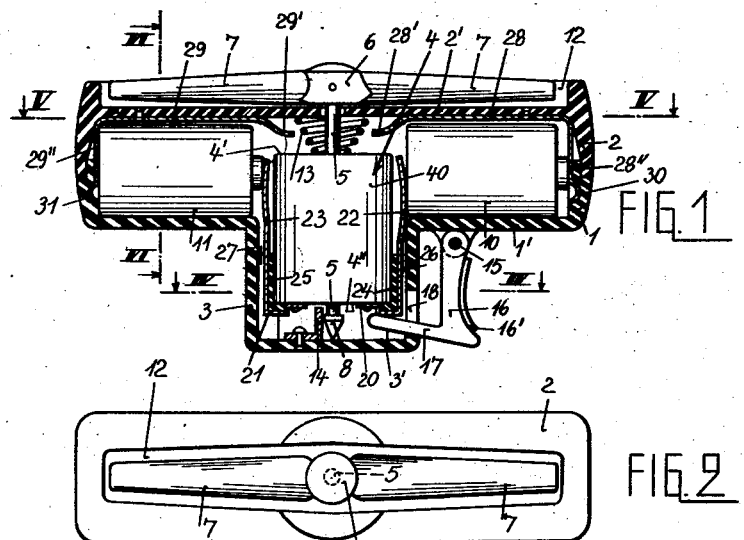
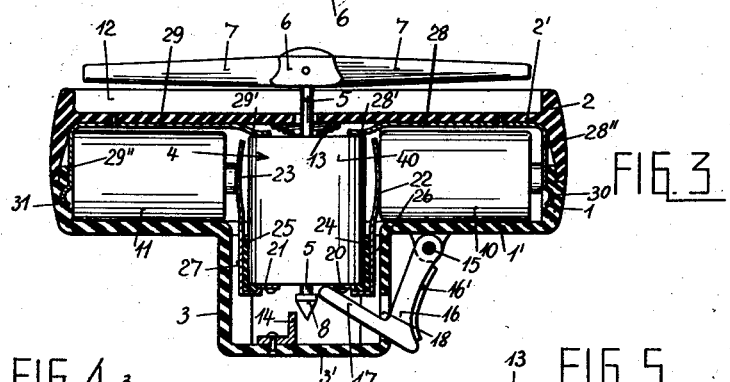
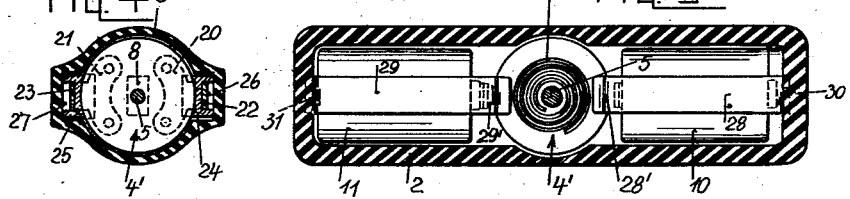
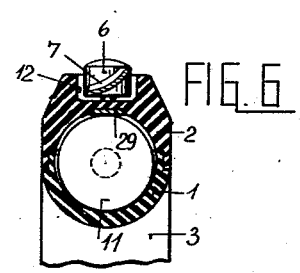
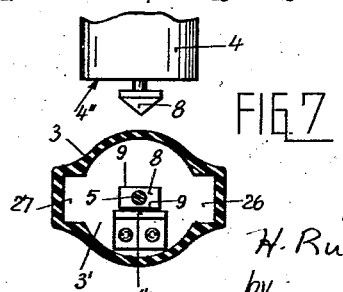
Inventor:
H. Ruppe et E. Probst
by
Glascock Downing Seebold
Attorney Patented Apr. 20, 1937

2,077,643

UNITED STATES PATENT OFFICE 2,077,643

ELECTRIC POCKET FAN

Hugo Ruppe and Eduard Probst, Berlin, Germany, assignors to Ernst Gross, Berlin, Germany Application July 16, 1935, Serial No. 31,668
In Germany July 28, 1934

12 Claims. (Cl. 230—259)

Our invention relates to electric pocket fans of the type in which a propeller is operated by a small electric motor, and the motor is supplied by a dry battery. The motor and the battery are housed in a tubular casing.

It is an object of our invention to improve a pocket fan of the kind referred to, so that the improved pocket fan is exceedingly small, easily handled and operated, and simple in design, particularly with respect to its switching means.

To this end, we provide, in combination with a casing, a cylindrical electric motor arranged in the casing, so that the axis of the motor is at the centre of the casing, a propeller which is operatively connected to the motor for rotation by the motor shaft, and a battery whose cells are arranged transversely, and normally at right angles, to the axis of the motor.

In a preferred embodiment of our invention, we make the casing with an upper portion for the reception of the battery cells which is substantially rectangular, as viewed from the propeller, to this upper portion we connect a substantially cylindrical lower portion which extends centrally and transversely, normally at right angles, to the upper portion, and house the cylindrical motor in the lower portion.

Preferably, the motor is mounted to slide axially in the lower portion, and we provide means such as a trigger-like member outside the casing for shifting the motor, and contacting means in the casing for conductively connecting the motor to its battery cells after it has been shifted by the trigger.

In the accompanying drawing, a pocket fan embodying our invention is illustrated by way of example.

In the drawing

Fig. 1 is a vertical longitudinal section of the fan, showing its motor in the initial or inactive position, Fig. 2 is a plan view of Fig. 1, Fig. 3 is a section like the section in Fig. 1 but showing the motor in its active position, Figs. 4, 5, and 6 are sections on the corresponding section lines in Fig. 1, and Fig. 7 is a detail illustration showing means for arresting the motor shaft in a definite position.

Referring now to the drawing, the casing which is preferably made of pressed insulating material, comprises an upper portion 1 on which is placed a cover 2, the cover and the upper portion 1 being rectangular, as viewed in Fig. 2. Projecting from the lower side 1' of the upper portion is a substantially cylindrical or tubular lower portion 3. This portion projects from the upper portion 1 downwardly or to the rear, according to the position in which the fan is held. 3' is the bottom of the cylindrical lower portion 3.

A small electric motor 4, of any suitable type, and surrounded by a closed sheath 40, preferably of metal, is mounted to slide in the lower portion 3, and the axis of its shaft 5 is in the axis of the tubular projection 3, and in the axis of the fan casing itself.

The upper end of the motor shaft 5 projects through a hole in the cover 2 and supports the, preferably detachable, boss 6 of a propeller 7 with two blades. A spring 13 which is preferably tapered, as shown, is inserted between the lower face of the cover 2 and the top plate 4' of the motor 4 so that its tension holds a pointed nipple 8 at the lower end of the motor shaft 5 down on the bottom 3' of the lower portion 3. The nipple 8, as best seen in Fig. 7, has two parallel sides 9 for cooperation with an angle-section check 14 on the bottom 3', as will be described.

The motor is held against turning in the portion 3 by channel-section blocks 24 and 25, Fig. 4, engaging, respectively, in grooves 26 and 27 in the sides of the portion 3. Contact springs 22 and 23, whose lower ends 20 and 21, respectively, are bent over at right angles to engage the bottom plate 4'' of the motor 4, are inserted in the blocks 26 and 27, respectively, with their upper ends engaging, respectively, the bottom of one battery cell 10, and the electrode of the other battery cell 11. The two cells, or elements, 10 and 11 are inserted in the upper portion 1 of the casing in horizontal position, with the axis of each cell extending at right angles to the axis of the motor 4. Contacting springs 28 and 29 are secured to the lower face of the cover 1 above each cell. The free inner ends 28' and 29' of the springs are adapted to contact with the top plate 4' of the motor. The outer ends 28'' and 29'', respectively, of the springs are bent downwards along the inner ends of the cover 2, and equipped with catches 30 and 31, respectively, at their free ends. The catches engage in corresponding seats in the end walls of the upper portion 1, and hold the cover 2 against unintentional opening when it is on the upper portion.

The cover 2 has a recess 12 in its upper face in which the blades of the propeller are concealed in the inactive position, as illustrated in Figs. 1 and 6.

Pivotally mounted at 15 on the lower side 1' of the upper portion 1 is a trigger 16, of angular shape, with a knurled or otherwise prepared portion 16' to facilitate the handling of the trigger. An arm 17 of the trigger extends into the tubular lower portion 3 through a slot 18 in the side of the portion. The free inner end of arm 17 engages below the bottom plate 4" of the motor when the trigger is handled, as shown in Fig. 3. The bottom plate 4" is of insulating material. The reaction of spring 13 tends to move the trigger 16 into its initial position, Fig. 1, and its movement in this direction is limited by the arm 17 engaging the lower end of the slot 18.

The lower ends 20 and 21 of the contact springs 22 and 23, respectively, are secured to the bottom plate 4", and thereby the lower ends of the springs are insulated from the motor, while the springs themselves are insulated, and distanced, from the motor sheath 40 by the blocks 24 and 25.

In the initial position, Fig. 1, the circuit of the motor 4 is open, as the top plate 4' of the motor is below the inner ends of springs 28 and 29. When it is desired to operate the fan, the trigger 16 is moved inwardly with one finger of the hand in which the person holds the fan. The arm 17 of the trigger 16 now engages below the insulating bottom plate 4" of the motor 4 and the motor is elevated into the position illustrated in Fig. 3 against the reaction of the spring 13. The metal sheath 40 of the motor now engages below the inner ends 28' and 29' of springs 28 and 29, and the circuit of the motor is now closed, as the springs 22 and 23 remain engaged with the bottom of cell 10, and the electrode of cell 11, forcing the cells apart in outward direction and against the downwardly extending ends of springs 28 and 29. Upon the upward movement of the motor 4 from the inactive position, Fig. 1, into the active position, Fig. 3, the blades 7 of the propeller are lifted clear of the recess 12 in the cover 2 and are free to rotate when the motor circuit is closed at 28', 29'.

When the trigger 16 is released, the spring 13, by its reaction, returns the parts into the inactive position, Fig. 1, breaking the circuit of the motor. During the downward movement of the motor, the nipple 8 at the lower end of the motor shaft 5 engages the check 14 with one of its sides 9 and this position of the nipple arrests the propeller in such a position that it is ready for returning into the recess 12.

We claim:

1. In an electric pocket fan, a casing, a cylindrical electric motor arranged in the casing, with its axis coinciding with the central axis of the casing, a propeller operatively connected to the motor and normally disposed in close relation to the outside of the casing, a battery for supplying the motor including cells arranged in the casing with their axes at right angles to the axis of the motor and means to extend the propeller to a position spaced from the casing.

2. In an electric pocket fan, a casing comprising an elongated outer portion, guard means integral with the outer portion of the casing and a substantially cylindrical inner portion projecting from the centre of the outer portion at right angles thereto, battery cells in the outer portion at opposite sides of the inner portion, a cylindrical electric motor arranged in the inner portion, a propeller operatively connected to the motor and normally disposed to lie within the guard means and control means for extending the propeller beyond the guard means.

3. In an electric pocket fan, a casing comprising an elongated outer portion open at one side, a detachable recessed cover on the open side of the outer portion, a substantially cylindrical inner portion projecting from the centre of the outer portion at right angles thereto, battery cells in the outer portion below the cover and at opposite sides of the inner portion, a cylindrical electric motor reciprocably arranged in the inner portion and including a shaft slidable through the cover, and a propeller operatively connected to the motor shaft and normally arranged in the recess in the cover but extensible therefrom on sliding of the motor shaft, means for reciprocating the motor and contacting means controlled by the reciprocation of the motor for making and breaking the connection of the battery and the motor.

4. In an electric pocket fan, a casing, a cylindrical electric motor mounted to reciprocate axially in the casing, with its axis at the centre of the casing, a propeller operatively connected to the motor exteriorly of the casing and normally lying against the outer surface of the casing, a battery for supplying the motor including cells arranged transversely to the axis of the motor, a trigger pivotally mounted on the casing, an arm on the trigger which projects into the casing for engaging below the motor when the trigger is pulled to slide the motor and extend the propeller away from the casing, a spring which tends to move the motor against the movement imparted to it by the trigger, and contacting means controlled by the reciprocation of the motor, for making and breaking the connection of the battery and the motor.

5. In an electric pocket fan, a casing, a cylindrical electric motor mounted to reciprocate axially in the casing, with its axis at the centre of the casing, a propeller operatively connected to the motor exteriorly of the casing and normally lying against the outer face of the casing, a battery for supplying the motor including cells arranged transversely to the axis of the motor, contacting means for making and breaking the connection of the battery and the motor, manually operated means for moving the motor into its connection-making position and for extending the propeller into a position spaced from the casing, and a spring for returning the motor into its connection-breaking position.

6. In an electric pocket fan, a casing, a cylindrical electric motor mounted to reciprocate axially in the casing, with its axis at the centre of the casing, a propeller operatively connected to the motor and normally arranged in contact with the outer face of the casing, a battery for supplying the motor including cells arranged transversely to the axis of the motor, a plate of insulating material at the lower end of the motor, contacting springs secured to the plate and extending upwardly along opposite sides of the motor in spaced relation thereto, so as to remain in contact with the cells notwithstanding the reciprocation of the motor, means for reciprocating the motor for extending the propeller into a position spaced from the casing, and contacting means adapted to cooperate with the springs secured to the plate, for making and breaking the connection of the battery and the motor.

7. In an electric pocket fan, a casing, a cylindrical electric motor mounted to reciprocate axially in the casing, with its axis at the centre of the casing, a propeller operatively connected to the motor and normally lying against the outer face of the casing, a battery for supplying the motor including cells arranged transversely to the axis of the motor and for extending the propeller into a position spaced from the outer surface of the casing, means for reciprocating the motor, and a contacting spring for each cell the free end of which projects inwardly into the casing to make contact with the motor when the motor is moved toward the springs by said reciprocating means, while the outer end is in permanent contact with the electrode of the corresponding cell; for making and breaking the connection of the battery and the motor.

8. In an electric pocket fan, a casing comprising an elongated outer portion open at one side, a detachable cover on the open side of the outer portion, and a substantially cylindrical inner portion projecting from the centre of the outer portion at right angles thereto, battery cells in the outer portion below the cover and at opposite sides of the inner portion, a cylindrical electric motor mounted to reciprocate axially in the inner portion, a propeller operatively connected to the motor and normally contacting the outer surface of the casing, a contacting spring for each cell which is secured to the cover and whose free end projects inwardly into the casing to make contact with the motor, means for reciprocating the motor and for moving the motor into contacting position with the free ends of the springs and for extending the propeller into a position spaced from the outer surface of the casing, and a portion at the outer end of each spring being bent inwardly into the outer portion and away from the cover and arranged in permanent contact with electrode of the corresponding cell for making and breaking the connection of the battery and the motor.

9. In an electric pocket fan, a casing comprising an elongated outer portion open at one side and having depressions in the end walls, a detachable cover on the open side of the outer portion, and a substantially cylindrical inner portion projecting from the center of the outer portion at right angles thereto, battery cells in the outer portion below the cover and at opposite sides of the inner portion, a contacting spring for each cell which is secured to the cover, a spring catch at the outer end of each spring for engaging a depression in the corresponding end wall of the outer portion, a cylindrical electric motor mounted to reciprocate in the inner portion and adapted to move into contacting relation with the free inner ends of the springs, and a propeller operatively connected to the motor and normally contacting the outer surface of the casing but extensible into a position spaced from the casing when the motor is reciprocated.

10. In an electric pocket fan, a casing comprising an elongated outer portion, and a substantially cylindrical inner portion projecting from the centre of the outer portion at right angles thereto and having the opposed internal grooves, battery cells in the outer portion at opposite sides of the inner portion, a cylindrical electric motor mounted to reciprocate in the inner portion, a propeller operatively connected to the motor and normally positioned in contacting engagement with the outer face of the casing, a plate of insulating material at the inner end of the motor contacting springs secured to the plate and extending upwardly along opposite sides of the motor, blocks of insulating material on the motor for insulating the springs from the motor, for keeping the springs in spaced relation to the motor with the portions projecting beyond the blocks so that the portions remain in contact with the cells notwithstanding the reciprocation of the motor; and for engaging in the grooves of the inner portion of the casing so as to prevent turning of the motor, means for reciprocating the motor and for extending the propeller into a position spaced from the casing, and contacting means adapted to cooperate with the springs secured to the insulating plate at the lower end of the motor, for making and breaking the connection of the battery and the motor.

11. In an electric pocket fan, a casing, a cylindrical electric motor mounted to reciprocate axially in the casing, with its axis at the centre of the casing, a propeller operatively connected to the motor, a battery for supplying the motor including cells arranged transversely to the axis of the motor, means for reciprocating the motor, contacting means controlled by the reciprocation of the motor, for making and breaking the connection of the battery and the motor, a portion of the casing being recessed for receiving the propeller when the motor is in the connection-breaking position, and means for arresting the propeller when the motor is in the said position, so that it will enter the recess in said portion.

12. In an electric pocket fan, a casing, a cylindrical electric motor mounted to reciprocate axially in the casing, with its axis at the centre of the casing, a shaft in the motor the ends of which project from both ends of the motor while the outer end projects from the casing, a propeller on the outer projecting end of the shaft, a battery for supplying the motor including cells arranged transversely to the axis of the motor, means for reciprocating the motor, contacting means controlled by the reciprocation of the motor, for making and breaking the connection of the battery and the motor, a portion of the outer surface of the casing being recessed for receiving the propeller when the motor is in the connection-breaking position, a pointed nipple at the lower end of the motor shaft having two parallel faces, and a fixed check on said casing adapted to be engaged by one of the faces, for arresting the propeller when the motor is in the connection-breaking position, so that the propeller will enter the recess in said portion.

HUGO RUPPE.
EDUARD PROBST.